Dec. 11, 1956  L. J. FAGEOL  2,773,304
METHOD FOR THE PRODUCTION OF VEHICLES
Filed May 5, 1953  6 Sheets-Sheet 2
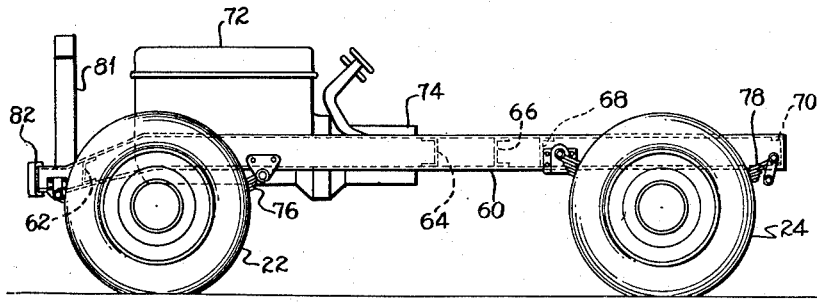
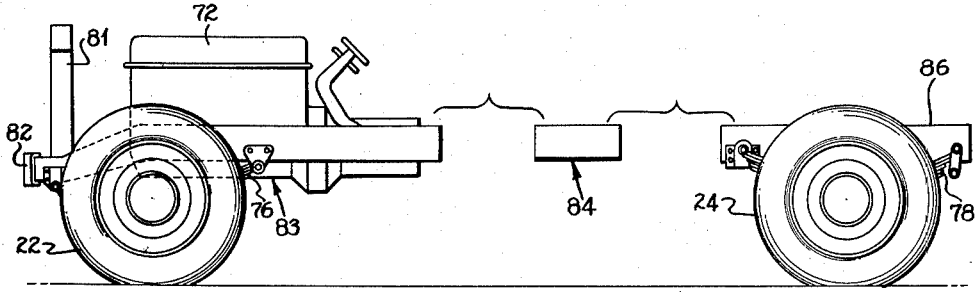
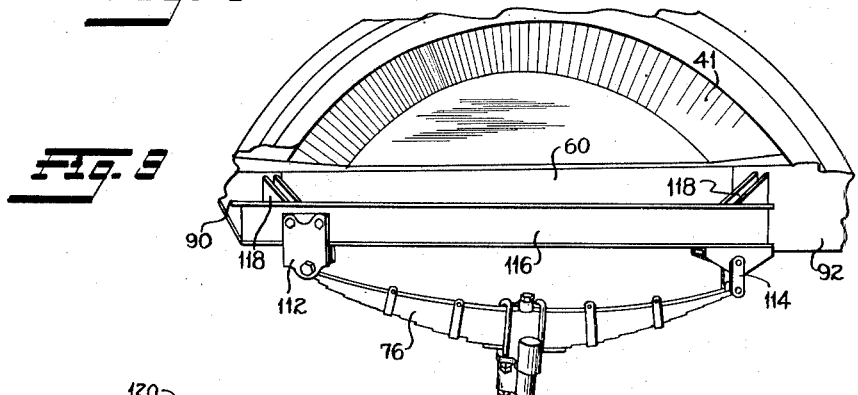
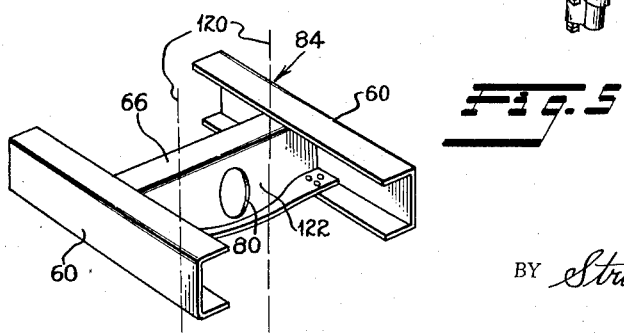
INVENTOR
LOUIS J. FAGEOL
BY Strauch, Nolan & Diggins
ATTORNEYS Dec. 11, 1956  L. J. FAGEOL  2,773,304
METHOD FOR THE PRODUCTION OF VEHICLES
Filed May 5, 1953  6 Sheets-Sheet 3

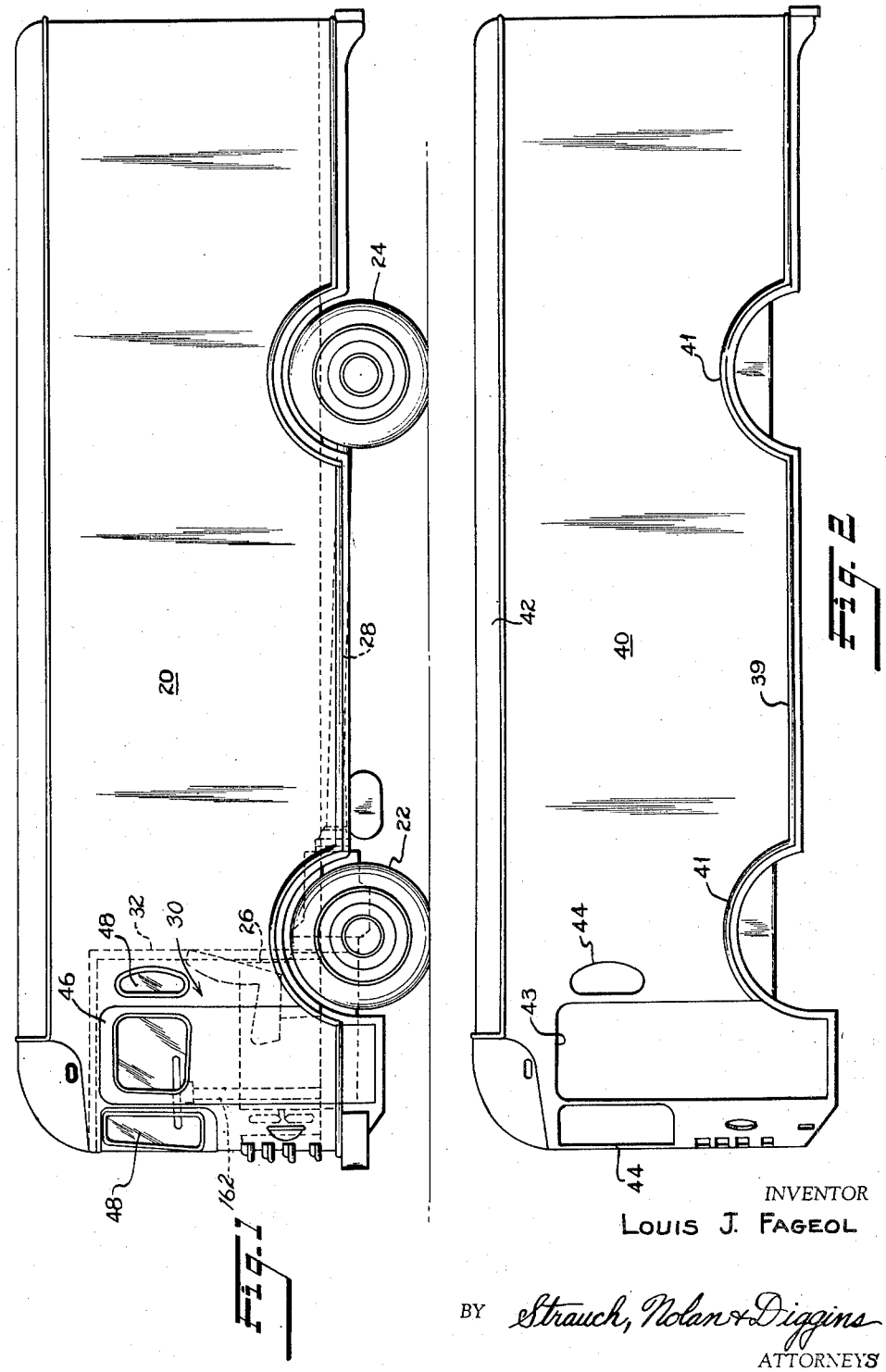

INVENTOR
LOUIS J. FAGEOL
BY Strauch, Nolan + Diggins
ATTORNEYS

Dec. 11, 1956  L. J. FAGEOL  2,773,304
METHOD FOR THE PRODUCTION OF VEHICLES
Filed May 5, 1953  6 Sheets-Sheet 4
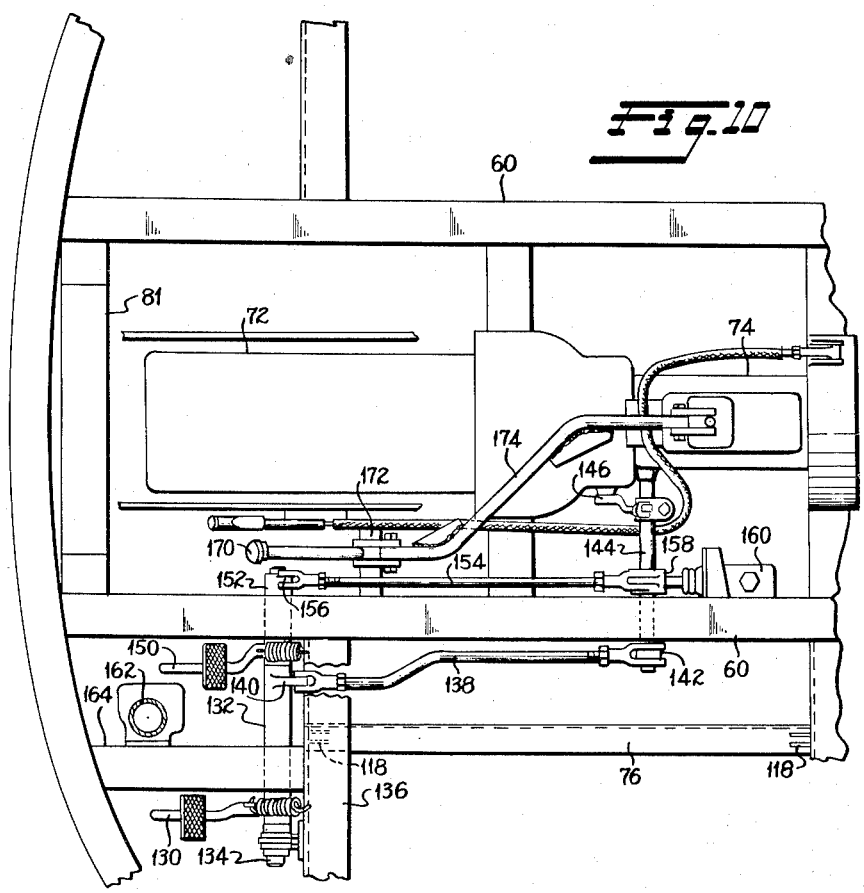
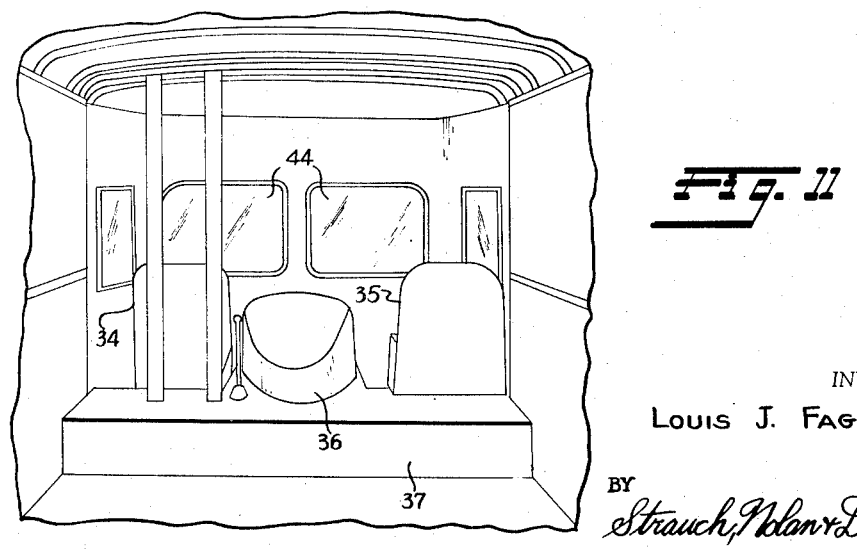
INVENTOR
LOUIS J. FAGEOL
BY
Strauch, Nolan & Diggins
ATTORNEYS

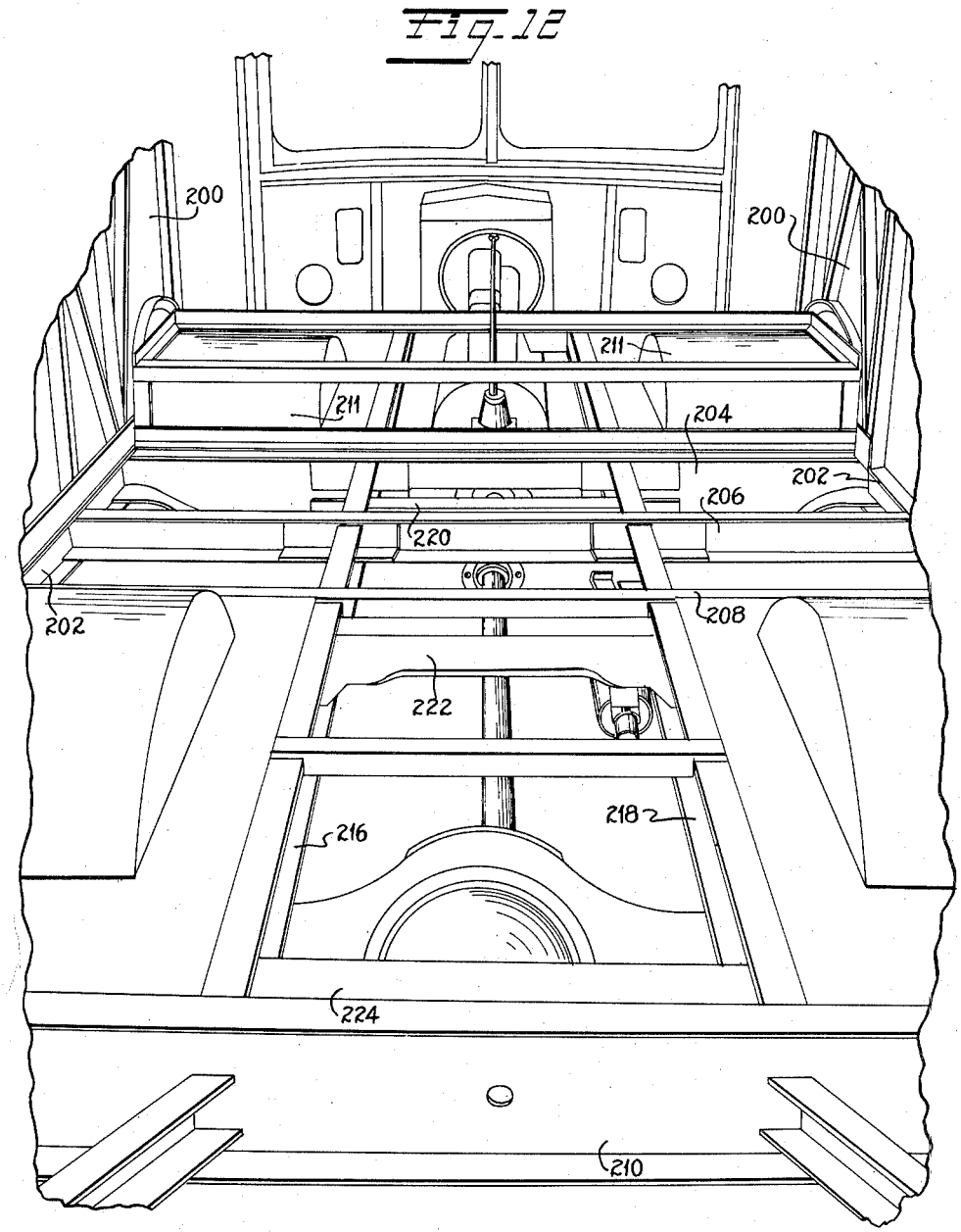

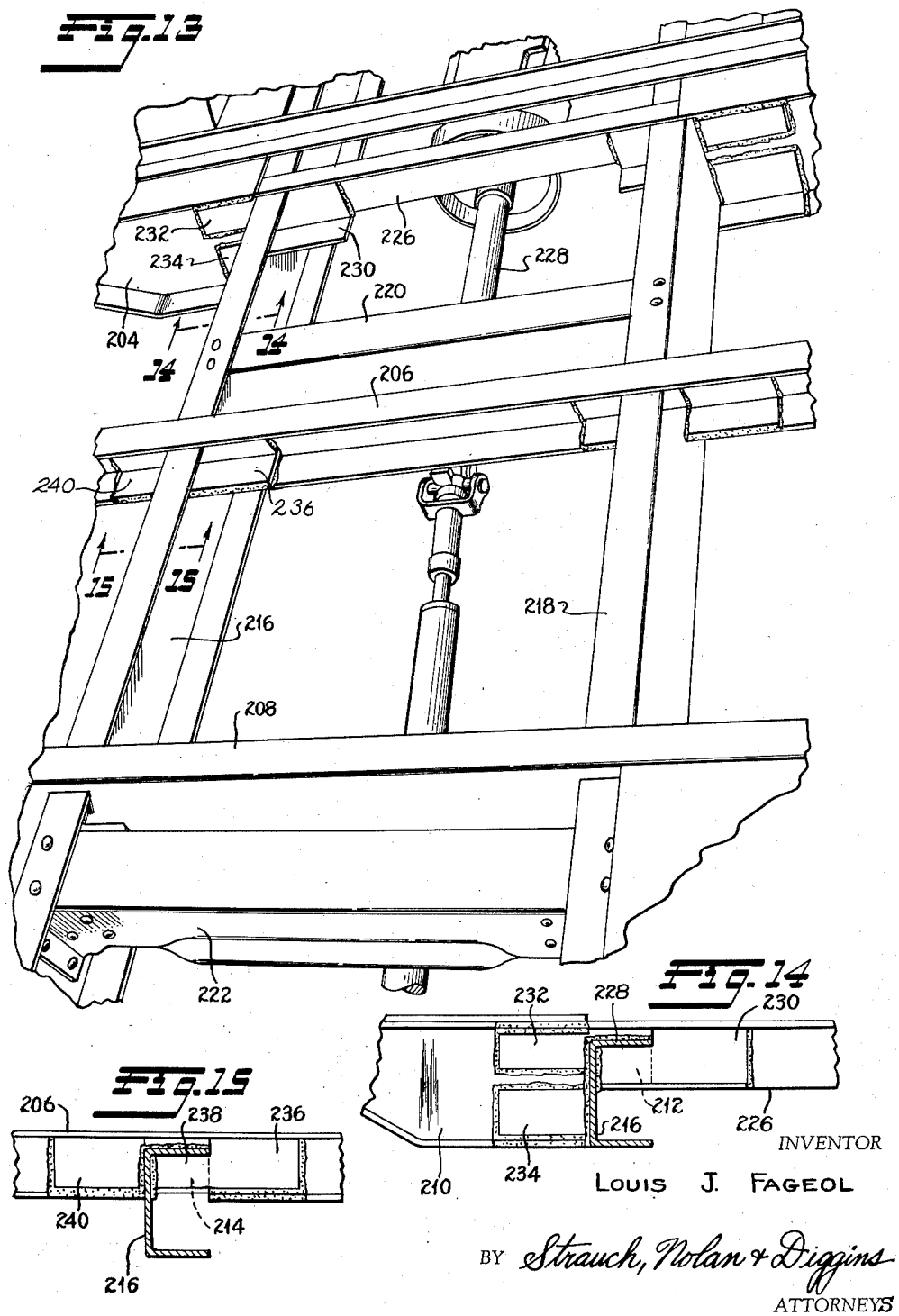

United States Patent Office 2,773,304
Patented Dec. 11, 1956

2,773,304

METHOD FOR THE PRODUCTION OF VEHICLES

Louis J. Fageol, Kent, Ohio, assignor to Twin Coach Company, Kent, Ohio, a corporation of Ohio Application May 5, 1953, Serial No. 353,059

1 Claim. (Cl. 29—469)

The present invention relates to self-propelled vehicles and more particularly to low cost, high capacity integral design freight or cargo trucks. The invention further relates to methods of manufacturing such high capacity integral freight or cargo trucks and the like.

A demand has long existed for such vehicles which has not been met by prior vehicle design, except for special units the high cost of which has prevented their widespread adoption or use. This unfilled need has existed largely because the potential market for vehicles of the type with which this invention is concerned is not sufficient to warrant investment in engineering and mass production tooling necessary to create such vehicles at practical costs.

As a result of the failure of the heavy-duty motor truck manufacturers to furnish lightweight integral design vehicles to meet this need, large capacity tractor drawn semi-trailers have come into wide use in operations where a straight truck or single vehicle of proper design is far better adapted. Because the practical market for use of trailers and semi-trailers is very broad as compared to markets for straight trucks, trailers and semi-trailers are produced in large volume with resulting low costs.

In addition trailer manufacturers have accomplished outstanding results by engineering weight out of their units to increase pay load.

These advantages in pay load capacity are largely offset by excessive weight in the average production tractor or power unit. This lowers pay load capacity under most State laws regulating total gross vehicle weights. These combination vehicles also create traffic hazards due to excessive and unnecessary over-all lengths. They are, therefore, also difficult to maneuver in congested traffic and have a tendency toward jackknifing due to coupling designs or arrangements. Also, because of the use of two vehicles to accomplish the work of one, cost factors are far from the minimum possible, if a properly designed straight truck were created which enjoyed the advantages of low production costs made possible by high volume.

It is, accordingly, the primary object and purpose of the present invention to provide novel methods for manufacturing integral self-propelled light weight, high capacity vehicles of minimum overall length, with improved efficiency and maneuverability at low cost in relatively small volume.

It is a more specific object to provide novel methods for converting standard mass produced production line truck chassis and trailer bodies into integral design self-propelled vehicles which have substantially the same load carrying capacity as trailer bodies.

These objects are accomplished by utilization of standard mass production trailer or semi-trailer bodies and standard mass production truck chassis which, by means of simple modifications and attachments, are converted into self-propelled vehicles to meet the uses and markets as set forth herein.

For high capacity freight cargo carriers and the like incorporating the present invention, standard cargo type trailers or semi-trailers with level floors entirely above the tops of the wheels are converted into self-propelled vehicles. For furniture vans and other uses requiring lower floor height, standard trailer or semi-trailers having floor level sections and rear fender wells are utilized by the addition of front fender wells to accommodate the mounting of conventional front steering axle.

In accordance with one embodiment of the invention the standard chassis is dissected preferably into three portions, the forward portion containing the power plant and transmission, the center section containing the support for the drive shaft and the rear section containing the rear drive axle and spring assembly. These chassis sections are then rigidly secured to the body floor frame members of a standard mass produced trailer unit to form an integral part thereof.

The invention in another of its forms also comprises the installation of a standard mass-produced chassis unit in the floor of a standard mass-produced trailer unit without dissection of the former where its wheel base permits. This installation is accomplished by modifying the cross floor members of the trailer body to accommodate the installation of the chassis unit and the welding of the two units together to form an integral vehicle in which the cooperating members of the trailer body and the chassis become a part of a continuous welded understructure without sacrifice of strength or weight.

It is to be understood that the terms "trailer unit" or "trailer" are intended to include both semi-trailers and trailers.

In all conversions, a driver's compartment is provided at the forward end and an entrance door and wind shield are inserted in the trailer skin at the forward end thereof. In accordance with the present invention these changes and the necessary rearrangement of the structural members and elimination of a portion of the trailer skin are accomplished without affecting structural design or strength of the basic trailer unit.

To drive the vehicles, a standard production line chassis with an internal combustion power plant and all accessories is attached to the cross members of the trailer body floor in accordance with either of the methods noted above. In this manner the chassis frame serves as a sub frame, which can be arranged to provide optimum weight or load distribution. The standard chassis rear drive axle or axles are substituted for the rear trailer axles and the front axle is mounted in whatever position is required to provide optimum ⅓ front ⅔ rear loading on axles when the unit is carrying maximum loads.

For steering the vehicles, conventional steering mechanisms controlled from the driver's compartment may be provided utilizing the front axle and associated steering mechanism of the forward portion of the chassis. If desired a power steering mechanism can be incorporated in the vehicle. Suitable brake controls and other operational equipment are all provided in the driver's compartment.

Concrete examples of advantages which are forthcoming in vehicle weight savings and manufacturing cost through utilization of the conversions and adaptations as set forth herein have been determined by actual cost analysis and comparison with the best prior vehicles and manufacturing methods.

For example, it has been found that on cargo or freight carrying bodies with approximately 32 lineal feet of loading platform space, weight savings will range from 5000 to 8000 pounds on one of the converted self-propelled vehicles over a powered tractor trailer combination having identical horsepower or performance factors with a semi-trailer body attached having identical lineal and cubic footage capacity.

Approximately one-half of this weight saving can be used to carry additional pay load on the converted self-powered trailer unit. The balance of this weight saving, is, of course, applied to the reduction of total gross vehicle weight. The additional pay load factor varies somewhat with state regulations, although on the average, substantial gains are legally possible.

In the smaller sizes, in comparison to conventional straight trucks, the vehicles are four to six feet shorter, and the larger units which compete with tractor trailers are eight to ten feet shorter than prior vehicles of similar capacity due to the elimination of the tractor or power unit. This permits greater maneuverability in congested areas and reduces highway traffic hazards substantially.

Cost studies further indicate that the vehicles according to the present invention can be sold on the retail market for a minimum of 10% less than any vehicle or combination of vehicles having the same horsepower and cargo space. With further reference to the economies effected by the present invention as compared with conventional designs of comparable total vehicle weight and structural quality it has been found that the main trailer body structure as taken from the mass production manufacturer's plant, assembled and ready for attachments for conversion to a cargo carrier can presently be purchased for approximately 42% of the present material costs prior to fabrication or later expense necessary to assemble the conventional cargo carrier body structure.

In comparing the finished product, or, in other words, adding the comparative labor factors involved to complete each vehicle, the facts will reveal that only 40 to 50% of the man hours are required, dependent on model, to complete the conversion, when compared with the total of 1000 to 1200 man hours necessary to complete a comparable, high quality integral design unit in current production today.

Broken down into terms of net savings in manufacturing or selling costs, this results in savings of 18 to 20%.

It is accordingly an additional object of the present invention to provide self-propelled integral cargo or special purpose vehicles having the above stated manufacturing and operating advantages and economies and to provide novel methods for their manufacture.

Further objects and advantages will become apparent as the decription proceeds in connection with the accompanying drawings in which:

Figure 1 is a side elevation of a typical self-propelled vehicle incorporating the present invention and constructed in accordance with a preferred method of the invention;

Figure 2 is a side elevation of a standard mass produced trailer body utilized in the manufacture of the vehicle of Figure 1;

Figure 3 is a side elevation of a standard mass produced chassis utilized in the manufacture of the vehicle of Figure 1;

Figure 4 is a view similar to Figure 3 illustrating the method by which the chassis unit is dissected prior to installation in the trailer body of Figure 2;

Figure 5 is a perspective view of the mid-section of the chassis after removal from the forward and rear sections of the chassis;

Figure 9 is a fragmentary perspective view of a part axle spring assembly of the vehicle of Figure 1;

Figure 10 is a fragmentary plan view of the installed power plant particularly showing details of the control installations;

Figure 11 is a fragmentary interior perspective view of the completed trailer showing the location of the seats and the engine and wheel housing coverings;

Figure 12 is a fragmentary perspective view of the forward portion of the interior of a vehicle constructed in accordance with a modified method of the invention;

Figure 6:
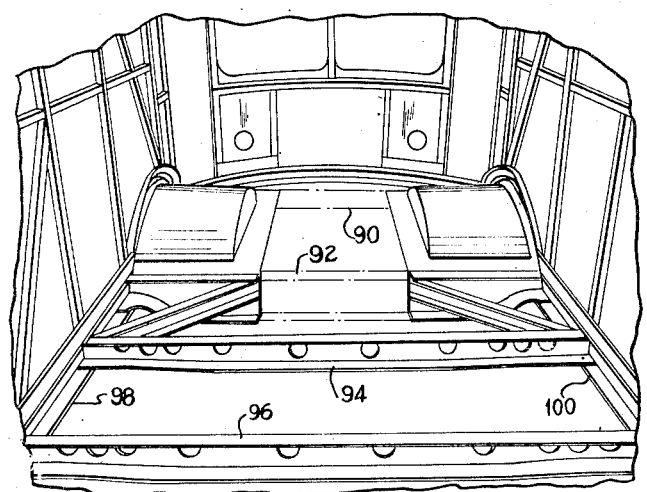
Figure 6 is a fragmentary perspective view of the interior of the trailer body in which the modifications necessary to permit the installation of the chassis power plant section are indicated in phantom lines.

Figure 13 is an enlarged fragmentary perspective view of a portion of Figure 12; and Figures 14 and 15 are sectional views taken along lines 14—14 and 15—15 respectively of Figure 13 illustrating details of construction.

Referring now more particularly to the drawings, Figure 1 illustrates a typical cargo carrier to which the invention has particular application. However, it is to be understood that the invention in its broader aspects may be applied with equal advantage to buses and special purpose vehicles. The installation of specialized equipment or seats within the space or other modifications necessary to adapt the vehicle for special purpose uses, in themselves, form no part of the invention.

The principal components of the finished cargo carrier illustrated in Figure 1 are the load carrying body 20, the front and rear wheel assemblies 22 and 24, respectively, and the power plant assembly 26 which is drivingly connected to the rear wheel assembly by a drive shaft 28.

At the forward end of the vehicle a driver's compartment, indicated generally at 30, is provided and may be separated from the load carrying interior space of the vehicle by a partition 32 if desired. As shown particularly in Figure 11 the driver's compartment is provided with seats 34 and 35 which are arranged in side-by-side relation with the power plant assembly 26 which is enclosed by a suitable housing 36 preferably hinged or removably secured in place to permit easy access for inspection, maintenance and repair. Also as shown in Figure 11 the front wheel housings are preferably enclosed by a suitable flat housing 37.

Referring again to Figure 1, the space behind the partition 32, if one is provided, or behind the driver's seats in any event is available in its entirety as a cargo carrying space.

In accordance with one aspect of the present invention the body portion of the vehicle of Figure 1 is preferably converted from a standard mass produced trailer unit such as that shown in Figure 2, and described in detail in application Serial No. 267,076 filed January 18, 1952. The cost and space advantages afforded by the present invention are perhaps realized most fully by the utilization of such a low cost, low weight trailer unit as an integral part of a self-propelled vehicle with inexpensive and easily performed modifications which permit the maximum utilization of the load carrying capacity of the original trailer. The floor 39, walls 40, wheel housings 41, roof 42 and other major structural components of the trailer body shown in Figure 2 are thus substantially unchanged in the conversion to the integral self-propelled vehicle shown in Figure 1. The principal modifications of the basic trailer unit in the conversion to the integral self-propelled vehicle are the interruption of the trailer skin in the forward area to provide the necessary door and window openings 43 and 44, respectively, to permit the installation of the doors 46 and windows 48 shown in Figure 1. It has been found in actual practice that despite the fact that the usual standard mass produced trailer unit is of stressed skin construction, the skin at the forward end of the vehicle ahead of the forward wheel installation may be cut away as shown in the window and door areas without appreciable loss of the strength or rigidity of the original unit.

In accordance with another aspect of the invention the power plant and wheel assemblies of the self-propelled vehicle of Figure 1 are preferably derived from the conversion of a standard mass produced chassis unit of the type shown by way of illustration in Figure 3. The steps in the conversion of the chassis unit of Figure 3 and in the modification of the trailer body necessary to combine the units of Figures 2 and 3 into the integral self-propelled vehicle of Figure 1 are shown particularly in Figures 4 through 8 which will now be described.

The standard mass produced chassis unit illustrated semi-diagrammatically in Figure 3 consists essentially of two main longitudinally extending frame members 60 joined by intermediate cross members 62, 64, 66, 68 and 70. A power plant 72 is supported between the two channel members 60 in conventional manner together with a transmission mechanism 74. The front and rear wheel and axle assemblies 22 and 24, the latter including the differential housing, are supported on front and rear springs 76 and 78, respectively, in conventional manner. The transmission and rear axle are drivingly connected by the usual drive shaft 28 which extends through an aperture 80 in the cross channel member 66. A radiator 81 and bumper assembly 82 are also mounted at the forward end of the chassis in conventional manner.

The first step in the modification of the chassis unit is that of dissecting the chassis into three separate components, a forward section indicated generally at 83, a mid-section indicated generally at 84 and illustrated in detail in Figure 5 and a rear section 86. The chassis may be dissected by any convenient means such as a cutting torch or saw. This operation is performed after removal of the drive shaft and other accessories as necessary.

Figure 7:
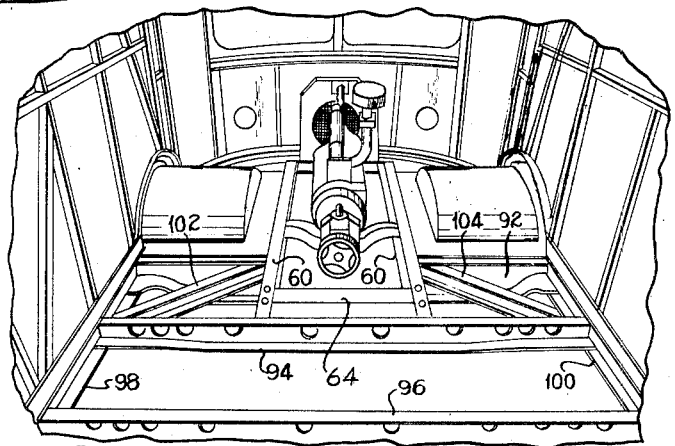
Figure 7 is a view similar to Figure 5 showing the installed power plant chassis section.

The installation of the forward section in the trailer body and the necessary modifications of the trailer body to permit this installation will now be described with particular reference to Figures 6 and 7. As there shown the substructure or floor supporting members of the trailer body comprise a number of cross channel members for example those shown at 90, 92, 94 and 96 which are welded at their opposite ends to the main longitudinal frame members 98 and 100 of the trailer body. To create the necessary opening the forward end of the vehicle to accommodate the forward chassis section 83 is necessary merely to remove the portions of the cross members 90 and 92 shown in Figure 6 in phantom lines. The forward chassis section will then be installed as shown in Figure 7 by welding the frame members 60 of the chassis to the ends of the severed channel members 90 and 92 and to points along the length of channel member 94. The standard trailer body and chassis units are selected so that the size of the forward section 83 of the chassis may be accommodated in the trailer floor as shown in Figure 7 to dispose the bumper assembly slightly forward of the forward end of the trailer as shown in Figure 1 so that it may function as the main bumper for the completed vehicle. If desired, additional, diagonal channel members, for example 102 and 104, may be added between the members 92 and 94 to provide additional strength in the forward end of the vehicle. Operational tests have demonstrated that the resulting structure as shown in Figure 7 is at least as strong as the original trailer floor structurally and has adequate strength to provide support for any load capacity for which the trailer body was originally designed.

In most cases the tread of the original chassis unit will be less than that required in the converted vehicle. In such cases the required extra tread can be provided by substitution of a longer axle and the repositioning of the springs. A comparison of the relative location of the power plant 72 and the front wheel and axle assembly 22 as shown in Figures 1 and 3 indicate that, in any event, the front wheel, axle, and spring assembly must be moved rearwardly in converting the chassis for use in the finished self-propelled vehicle. In cases where the original tread of the chassis unit is sufficient it is necessary merely to move the spring supporting brackets rearwardly along the chassis members 60.

A typical installation for providing extra tread at the front of the vehicle is illustrated in Figure 9. As there shown the spring assembly 76 is attached to brackets 112 and 114 which correspond to these originally furnished on the chassis. The brackets 112 and 114 in turn are supported on a heavy channel 116 which is welded preferably with reenforcing plates 118 to the cross channel members 90 and 92 parallel to and outwardly of chassis frame 60 at a level which will prevent interference between the wheel and the wheel housing 41 throughout the full travel of the springs.

The mid section 84 is further dissected before installation in the trailer floor. Specifically, the section is cut along the reference lines 120. After being so cut the resulting small panel 122 is welded or otherwise rigidly attached to one of the central channel cross members so that the opening 80 projects downwardly therefrom in alignment with the transmission 74 and the differential so that it may receive and support a bearing support for the drive shaft 28.

Figure 8:
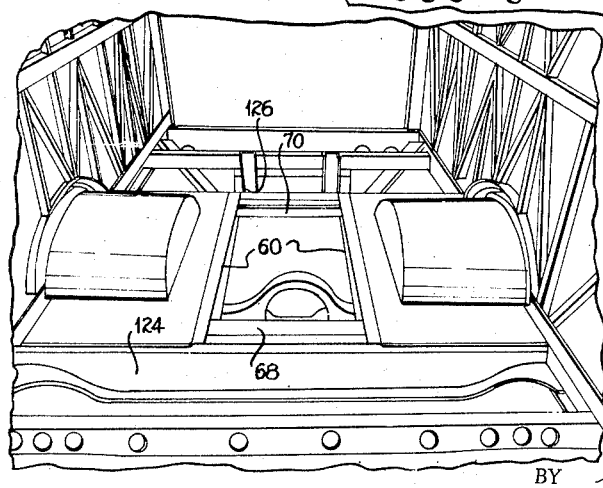
Figure 8 is a fragmentary perspective view of the rear of the interior of the trailer body of Figure 2 illustrating the installed position of the rear chassis section.

As shown in Figure 8 the rear chassis section 86 is installed in much the same manner as the front chassis section 82, being welded at its opposite ends to the heavy rear cross channel members 124 and 126 which extend transversely of the trailer floor forwardly and rearwardly, respectively, of the rear wheel housings after the interfering cross channel members have been cut away. Again, if necessary the rear spring assembly may be moved outwardly and mounted on separate channel members and installed in a manner similar to the front wheel assemblies as shown in Figure 9.

With the forward, mid and rear chassis sections installed as above described, the power plant is drivingly connected to the rear driving axle through an elongated drive shaft 28.

The remainder of the conversion necessary to complete the vehicle of Figure 1 relates to the installation of controls for the power plant, accessories such as fuel tanks, the required lighting equipment, windows, doors, and floors and, if desired, wooden walls and interior partitions. Since in most cases the interior of the vehicle will be finished to suit the particular user's specifications the installation of a particular interior and floor arrangement will be accomplished in accordance with well known practices and need not be further described.

The brake, clutch, steering and other vehicle and power plant controls may be installed in a number of ways. In each case the controls are preferably arranged to permit maximum utilization of existing linkages and mechanisms.

A typical installation of the clutch and brake controls is shown in Figure 10. The clutch pedal 130 is rigidly attached to a collar 132 rotatably mounted on a shaft 134 supported at spaced points along its length on a cross channel member 136 of the trailer floor structure. A push rod 138 is pivotally secured at its opposite ends respectively to an ear 140 on the collar 132 and an off-set lug 142 non-rotatably secured to the clutch operating shaft 144 which is connected to the normal clutch operator 146. The brake pedal 150 is in similar manner secured to a second collar 152 rotatably mounted on the shaft 134. A second push rod 154 is attached at its opposite ends respectively to a lug 156 integral with a collar 152 and the operating lever 158 for the master cylinder 160.

The steering column 162 is vertically disposed as shown in Figure 1 and as shown in Figure 10 is located between the clutch and brake pedals forwardly thereof and attached to a frame member 164 of the trailer floor. The steering column is attached by conventional linkages to the front wheels.

It is to be particularly noted that the brake and clutch pedals as well as the steering column are located at a point closely adjacent the forward end of the vehicle to permit the installation of the driver's and helper's seats at the opposite sides of the power plant. This permits maximum utilization of the interior of the trailer for load carrying purposes.

The gear shift lever 170 is attached to a bracket assembly 172 suitably supported on the original chassis structure to permit the usual forward, rearward and lateral movement of the lever. The gear shift lever is connected to the transmission 74 by a link 174, the lever arms of the linkage system being preferably arranged so as to preserve to original motion of the gear shift lever.

The driver's compartment is completed by the installation of an instrument panel and the remaining controls such as accelerator and throttle controls, which may be arranged in accordance with practices well known in the art through simple linkages, and by the installation of the seats 34 and 35 and the hinged cover or housing 36 for the power plant.

An alternate method for the conversion of standard mass produced chassis and trailer units into an integral self-propelled vehicle is illustrated in Figures 13 through 15. This method has particular utility in cases where the length of the available standard mass produced trailer and chassis units are such that the chassis will provide the necessary wheel base without elongation or dissection.

Broadly the method involves the notching or cutting away of the cross members of the standard trailer body floor to accommodate the longitudinal frame members of the chassis unit and rigidly securing the latter within the notches or cut away portions of the trailer body. Reinforcing plates or gussets may be added where required to maintain the original strength of the trailer body floor. By this method the frame members of the chassis become an integral part of the floor structure of the trailer body while preserving the strength, rigidity and low weight of the original components.

The standard mass produced trailer body shown in Figure 12, which is preferably of the same type as that shown in Figure 2, includes wall sections 200 rigidly secured to longitudinally extending rails 202. Also secured to the rails as by welding are the heavy trailer body floor cross members 204, 206, 208 and 210. The trailer floor also includes an additional cross member, not shown, extending across the trailer floor at the forward side of the forward wheel housings 211. Each of these cross members is cut away or notched, for example, at areas 212 and 214 (Figures 14 and 15) to permit the insertion of the longitudinal frame members 216 and 218 of the standard mass produced chassis. In the ordinary case the chassis cross members 220, 222 and 224 do not interfere with the trailer floor cross members. The main body cross members, such as 204, which are of relatively deep section are also cut away in their central section as at 226 to avoid interference with the drive shaft 228.

As shown particularly in Figure 14 the channel member 216 is securely welded as at 228 to the trailer body member 210. To provide additional strength in this area a heavy angle iron 230 having an extension 232 fitting within the open side of channel 216 may be welded to the cross member 210 to replace the metal cut away in the area 212. Additional angle irons 232 and 234 may also be welded to the trailer floor member 210 opposite the closed side of the channel 216 as shown in Figure 14.

Similarly, as shown particularly in Figure 15, a reinforcing plate 236 having an extension 238 may be welded to the trailer floor member 208 to effectively replace the metal cut away in the area 214. Also a second reinforcing member 240 may be welded to the cross member 208 in the same manner as members 232 and 234.

It has been found in actual practice that the addition of the reinforcing plates, which are easily and inexpensively fabricated and installed, effectively preserves the strength of the original unit with a negligible weight increase.

The front wheel axle and spring assembly is also ordinarily moved rearwardly some 25" before the chassis is installed in the trailer body unit. The front axle is, in its relocated position, attached either to the chassis or the trailer body depending upon the tread desired as pointed out in detail above in connection with the description of Figure 9.

The remainder of the conversion of the vehicle shown in Figures 12 through 15 is completed in exactly the same manner as the vehicles of Figures 1 through 11.

Where standard units of proper size are available the conversion may be effected by the method shown in Figures 12 through 15 at even lower cost than the method described above in connection with Figures 1 through 11.

From the foregoing it will be apparent that the present invention provides for the fabrication, at substantially reduced cost, of a series of integral self-propelled vehicles through inexpensive adaptation and modification of standard mass produced units primarily designed for other purposes.

The invention herein disclosed may be embodied in other specific forms without departing from the spirit or essential characteristics thereof. For example, it is to be understood that it is within the scope of the invention to provide an integral self-propelled vehicle by dissecting the standard mass produced chassis unit for installation in a body especially designed and manufactured for the purpose. It is also within the scope of the invention to modify a standard mass produced trailer unit as described above by the addition of power plant and wheel assemblies which are not derived from a standard chassis unit. In each case substantial cost savings may be realized although they may be less than those possible in connection with the preferred methods disclosed in detail above.

The present embodiments are therefor to be considered in all respects as illustrative and not restrictive, the scope of the invention being indicated by the appended claim rather than by the foregoing description and all changes which come within the meaning and range of equivalency or the claim are therefor intended to be embraced therein.

What is claimed and desired to be secured by United States Letters Patent is:

In a method of constructing a self-propelled vehicle from a standard mass-produced chassis unit having a frame supporting front and rear wheels and a power plant and a standard mass-produced trailer unit having a floor including laterally extending frame members; the steps of cutting said chassis members between said power plant and said rear wheels to form separate front and rear chassis sections, cutting certain of said members of the floor of said trailer unit to form open areas in said trailer floor of a size corresponding to said front and rear chassis sections, installing said front and rear chassis sections respectively in said front and rear areas, and drivingly connecting said power plant and said rear wheels.

References Cited in the file of this patent

UNITED STATES PATENTS

| | | |
|---|---|---|
| 1,644,940 | Moyer | Oct. 11, 1927 |
| 1,676,258 | Fork | July 10, 1928 |
| 1,708,753 | Dalton | Apr. 9, 1929 |
| 1,772,735 | Romine | Aug. 12, 1930 |
| 1,992,815 | Craney | Feb. 26, 1935 |
| 2,088,120 | Smith | July 27, 1937 |
| 2,277,615 | Townsend | Mar. 24, 1942 |
| 2,291,626 | Huber | Aug. 4, 1942 |
| 2,540,859 | Birkin | Feb. 6, 1951 |